Jan. 26, 1965 G. H. LAPERSONNE 3,167,466
AUTOMATIC APPARATUS FOR GLUING AND CUTTING
KINEMATOGRAPHIC FILMS
Filed March 28, 1962 5 Sheets-Sheet 1

INVENTOR
GASTON HENRY LAPERSONNE
BY
ATTORNEY

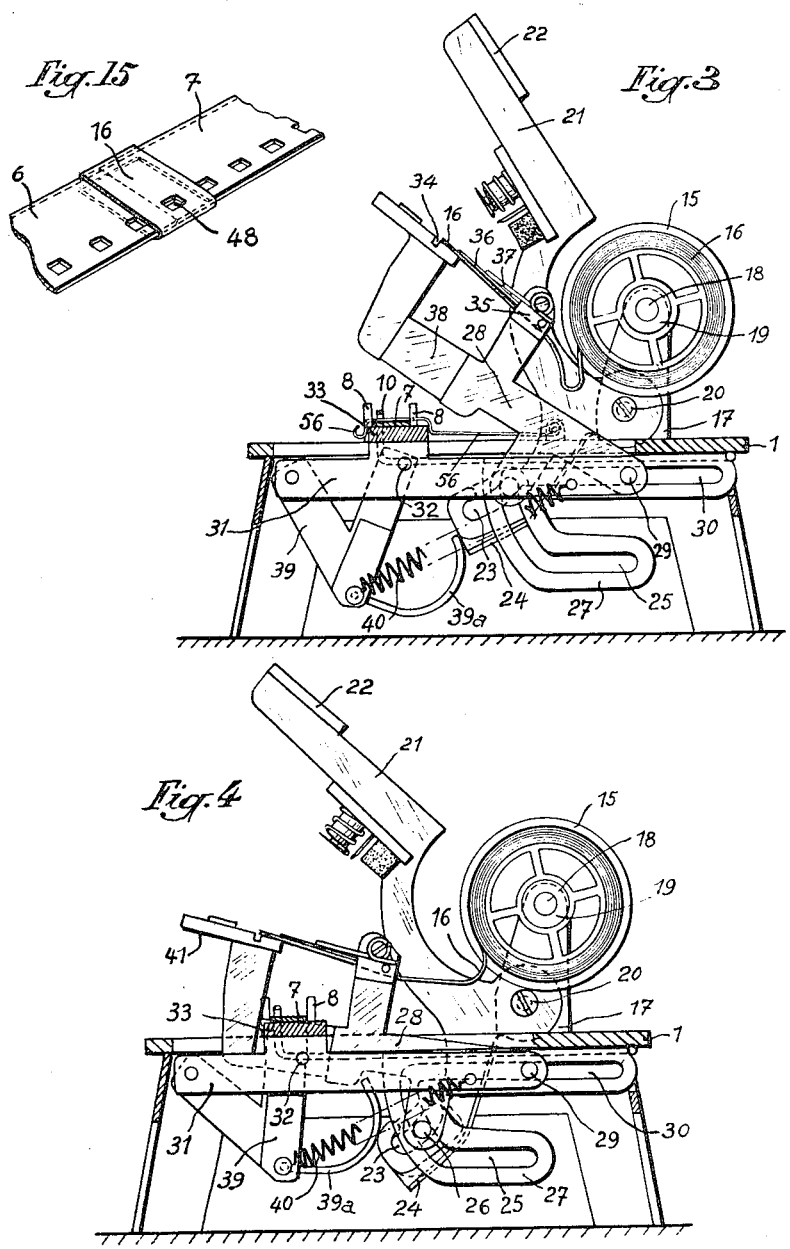

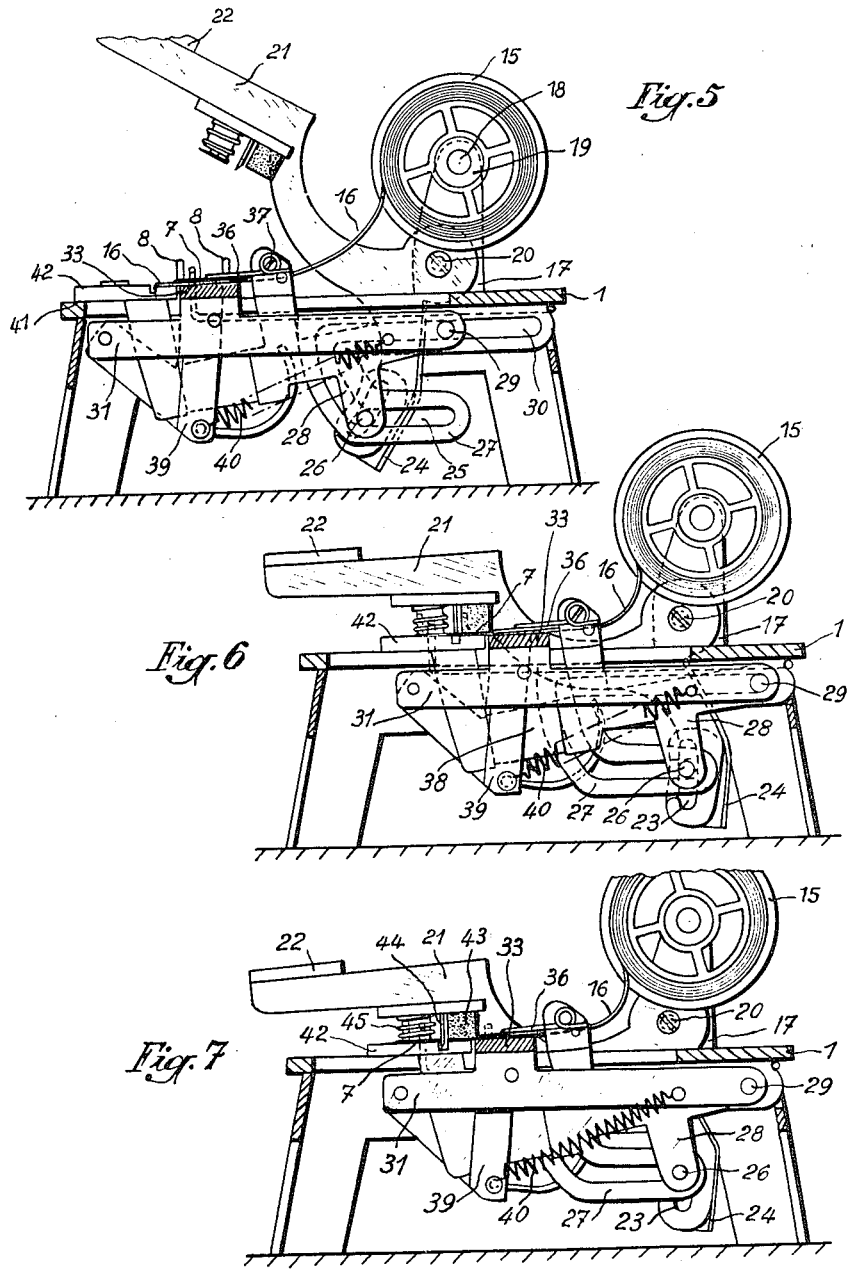

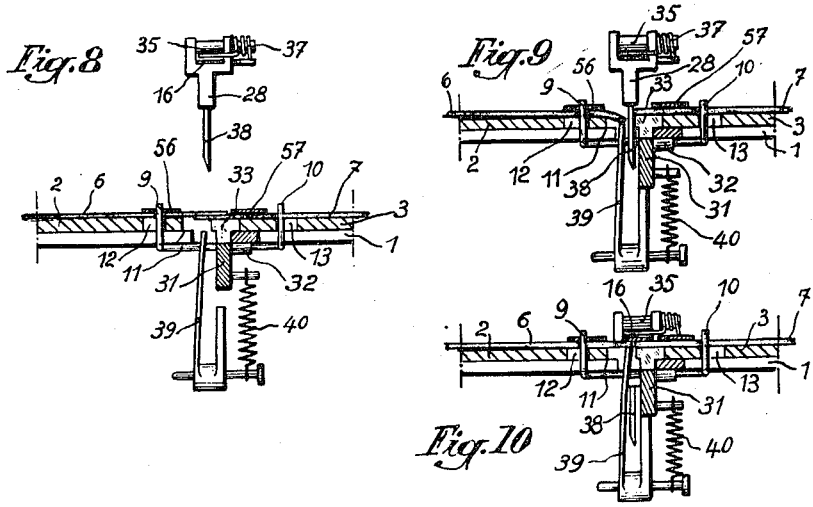
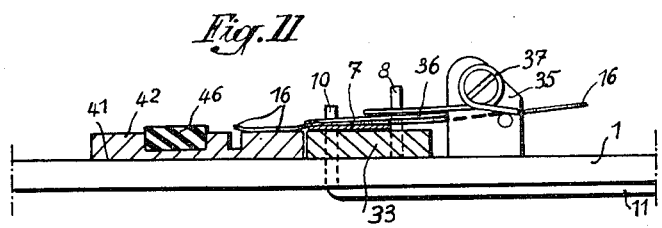
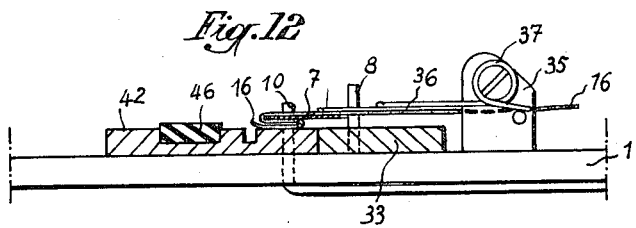
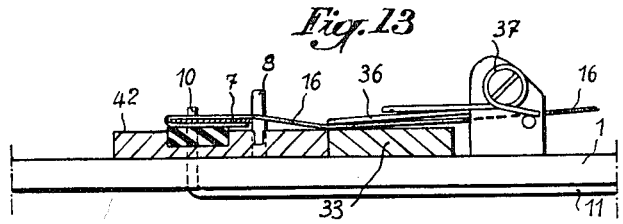

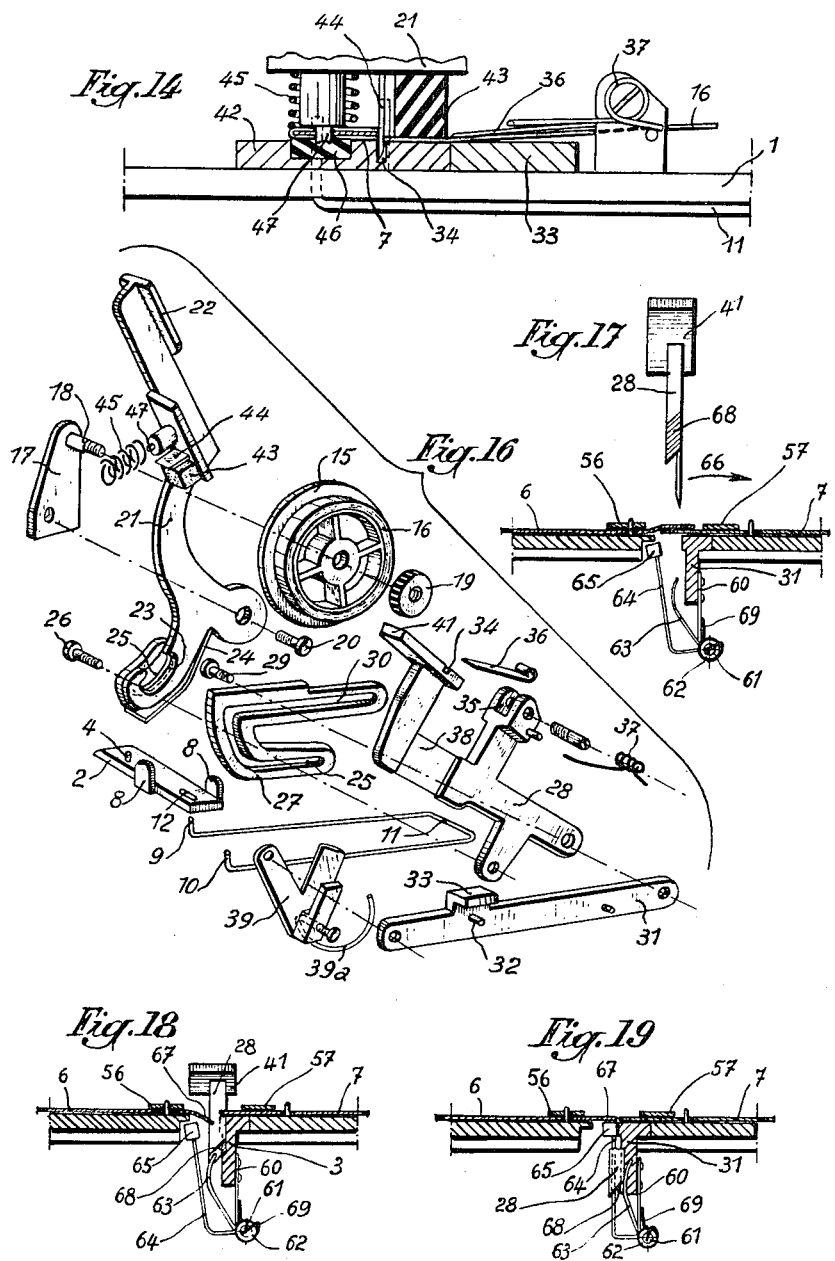

even though the film perforations have been cut, the V-shaped member 39 is sunk along its longitudinal axis, thereby reopening said perforations by using the flexibility and elasticity of the adhesive strip 16 the resistance of which is overcome by the action of the end of the lower arm of the control lever 21 acting on the nose 39a of the V-shaped member 39.

3,167,466

AUTOMATIC APPARATUS FOR GLUING AND CUTTING KINEMATOGRAPHIC FILMS

Gaston Henry Lapersonne, 30 Ave. de Montmirail, Nogentel par Chateau-Thierry, Aisne, France
Filed Mar. 28, 1962, Ser. No. 183,070
Claims priority, application France, Mar. 31, 1961, 857,530, Patent 1,294,169; July 18, 1961, 868,191, Patent 1,294,169
4 Claims. (Cl. 156—505)

My invention has for its object an automatic gluing and cutting apparatus for kinematographic films, that is an apparatus ensuring in sequence the operations required through the sole actuation of a control lever, in particular without any manual handling of an adhesive strip being required.

The advantages of my improved apparatus will appear clearly from the following description, reference being made to the accompanying drawings given by way of example and by no means in a limiting sense. In said drawings:

FIGS. 3 to 7 are side elevational views showing the apparatus at different stages of its operation.

FIGS. 8 to 10 illustrate details of the cutting means in elevational sectional view showing various stages of the cutting of the film.

FIGS. 11 to 14 are lateral sectional views showing the successive stages corresponding to the gluing of the film, to the cutting of the adhesive strip and to the release of the film perforation closed by said strip.

FIG. 15 shows the finished film after it has been treated in my improved apparatus.

FIG. 16 is an exploded perspective view, seen from three quarters from the left, showing the relative position of certain parts of the apparatus.

FIGS. 17 to 19 illustrate, at successive stages of operation, a modified embodiment of the means raising the end of the film during and after gluing.

Figure 1:
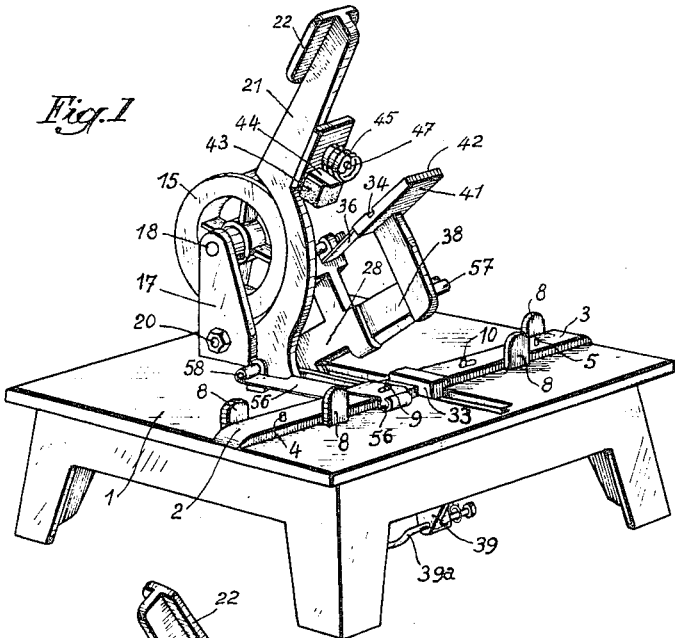
FIGS. 1 and 2 are three quarter perspective views, FIG. 1 showing my improved apparatus from the right-hand side and FIG. 2 from the left-hand side.
Figure 2:
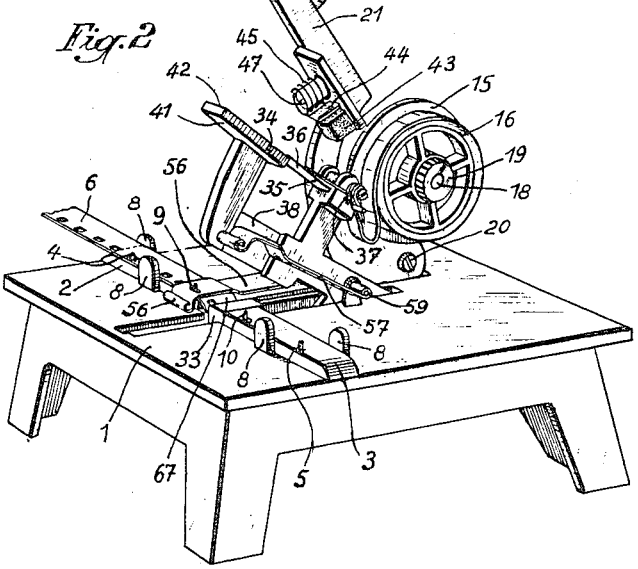

My improved apparatus includes a plate 1, to which are secured rigidly two film-guiding channels 2 and 3 arranged symmetrically and in alignment with each other. Said channels carry each a stationary stud 4 or 5 at the same distances from their inner ends as shown in FIGS. 1 and 2 and in each channel 2 or 3, the terminal section of the film to be treated, 6 or 7 as the case may be, it fitted over the corresponding stationary stud 4 or 5 so as to be guided between upstanding lugs 8 of the channels, the ends of the films being stretched by the ends 9 or 10 of a U-shaped spring 11, which ends form movable studs for said ends, said spring 11 extending underneath the plate 1 through which its ends 9 and 10 project as well as through the channels 2 and 3, as provided by the elongated slots 12 and 13 formed in the latter, which allow the spring to be shifted therein, as illustrated in FIGS. 8 to 16. The plate 1 is rigid with an upstanding flange 17 (FIGS. 1 and 3 to 7) carrying a threaded spindle 18 adapted to be engaged by the spool 15 of adhesive strip which is held fast by a washer and a knurled nut 19 (FIGS. 2 to 4 and 16). To the flange 17 is pivotally secured at 20 a control lever 21 provided with a surface 22 which forms the actuating member. The lower end of the control lever 21 is provided with an elongated slot 23 (FIGS. 3 and 4) and carries a flat spring 24 engaging adjacent the slot 23 a guideway member 27 provided with a slot 25 which is slightly narrower than the slot 23 and through which passes a threaded spindle 26. Said threaded spindle 26 passes also through the slot 23 and the guideway member 27 welded to the underside of the plate 1 and is secured to the lower arm of the knife-carrying lever 28. Said lever is pivotally secured to a further threaded spindle 29 adapted to move in a slot 30 forming an extension of the slot 25 engaging also a slider 31 which is guided by a stud 32 underneath the plate 1 and by a small plate 33 over the plate 1. Further parts will be described together with the actual operation of my improved apparatus.

FIG. 3 illustrates the apparatus when ready for operation. The spool of adhesive material 15 is positioned on its spindle 18 and the adhesive strip 16 is fed towards the slot 34 in the knife-carrying lever 28 on which said strip is held and guided by a guide 35 (FIGS. 2, 3 and 16) and by a blade 36 subjected to the action of a spring 37 and carried by the lever 28; this is obtained either when, for a first operation, the operator has thus positioned the adhesive strip, or else, the latter may remain in such a position after the preceding operation. The two film ends 6 and 7 are, on the other hand, positioned in the corresponding channels 2 and 3.

The above-described studs 4, 5, 9 and 10 may not be sufficient for properly securing the ends of the films to be glued in the corresponding channels and, consequently, in order to hold said ends fast, elastic pressure means 56 and 57 are arranged to either side of the knife-carrying lever 28, said means being pivotally carried at 58 and 59.

It is then sufficient for the operator to press home the operative surface 22 on the lever 21 to produce through this single depression the entire sequence of operations required.

During a first stage, the two film ends 6 and 7 are cut to the desired length; the lowering of the control lever 21 through its surface 22 from the position illustrated in FIG. 3 to that illustrated in FIG. 4 provides a sinking of the spindle 26 along the bent slot 27, which lowers the knife-carrying lever 28, the knife carried by which, 38, cuts the film ends over the small plate 33.

At the moment at which the two superposed film ends are cut, the strands which are not held and which face the bevelled edge of the knife, sink together with the latter. In order to provide for a correct gluing, it is necessary to bring the ends of the two strands exactly in registry with each other. For this purpose, at the end of its downward stroke, the knife-carrying lever produces also a shifting of a V-shaped member 39, held hitherto lowered through its nose 39a engaging the outer end of the lower arm of the control lever 21 and it is released and raised by its return spring 40 and during the application of the adhesive strip, it provides a bearing for the end of the film 6 cut by the knife 38.

During the following stage (FIGS. 5, 10 and 11), the spindle 26 has reached the bend of the slot 27, while simultaneously the knife-carrying lever abuts at 41 against the plate 1, so as to urge the adhesive strip 16 on the two film ends 6 and 7 with the interposition of the small blade 36.

During the next stage (FIGS. 6 and 12), the further lowering of the control lever 21 causes a receding movement of the spindle 26 along the horizontal arm of the slot 27, whereby the lever 28 and the slider 31 recede together, the plate 33 on said slider 31 engaging the plate 42 on the knife-carrying lever 28 which is then flush with it. During said receding movement illustrated in FIG. 12, the adhesive strip 16 is folded into the shape of a flat S and extends underneath the film ends 6 and 7 to which it adheres. This being done (FIG. 13), the adhesive strip 16 spreads out and extends throughout the lower surface of the film ends 6 and 7.

During the next stage (FIGS. 7 and 14), the lowering of the control lever 21 causes the latter to act directly, on the one hand, on a small resilient block 43 which urges the adhesive strip 16 onto the plate 42, while a small transverse knife 44 cuts through the adhesive strip 16 inside the slot 34 alongside the film and, on the other hand, on a spring 45 which holds the film engaged over a resilient block 46 while a perforating member 47 opens the perforation 48 on the film which has been precedingly closed through application of the adhesive strip 16. The short movement of the control lever 21 for execution of this perforation is allowed by reason of the presence of the spring 24 and the difference in breadth between the slots 23 and 25, without the slider 31 receding any further with the knife-carrying lever 28. Furthermore, the increased resistance of the spring 24 and of the resilient blocks 43 and 46 acts after the manner of an elastic stop at the end of the stroke.

Lastly, there is obtained, as shown in FIG. 15, an accurate gluing of the two film ends 6 and 7 together by means of the adhesive strip 16, the film perforation 48 being open. It is sufficient for the operator to now raise the operative lever 21 and to remove the glued film for my improved apparatus to be ready for a further cycle of operations, the parts returning into their starting positions as illustrated in FIG. 3.

For transportation, the control lever is lowered and the apparatus is thus reduced to a minimum bulk.

In the embodiment disclosed, the end of the film is raised by the V-shaped member 39 (as shown in FIGS. 3 to 7), which member, when inoperative, is held in a collapsed position but is returned by the spring 40 when released into a position such that its end may serve as a bearing for the film at the moment of its gluing.

In a modified embodiment illustrated in FIGS. 17 to 19, and in order to simplify the mechanism, the same result is obtained as follows: to the slider 31 is secured by means of a lug 60, a stationary transverse spindle 61 round which may revolve a socket 62 carrying two levers 63 and 64. The end of the lever 64 carries the support 65 which, as it rocks in the direction of the arrow 66 (FIG. 17), raises the end 67 of the film 6 and holds it in position at the moment at which the adhesive strip is being applied on the back of the film ends (FIG. 19.)

The lever 63 is shaped so as to bear against the slope 68 provided in registry with it at the lower end of the knife-carrying lever 28. Upon sinking from the position illustrated in FIG. 17 to that illustrated in FIG. 19, the slope 68 urges back the end of the lever 63 and makes it rock and drive along with it the socket 62; at the same time, the rocking of the latter causes a pivotal movement of the lever 64 of which the end carries the support 65 which is now positioned underneath the end 67 of the film 6 (FIG. 19).

The gluing and perforating operations are executed thenafter as in the preceding case and this being done, a partial raising of the control lever 21 brings the slider 42 forwardly whereby the pressure members 56, 57 are released and the glued film is released.

Said operation being executed, the rising movement of the lever 21 being finished, the knife 38 is also raised while at the beginning of said operation, the slope 68 (FIGS. 17 to 19) which had urged back the lever 63 controlling the rocking movement of the support 65, recedes under the action of the antagonistic spring 69 urging the levers 63, 64 in the opposite direction and this allows the collapsing of said support 65 so as to open a passage for the knife 38 which has to return into the uppermost position (FIGS. 3 and 17).

What I claim is:
1. An automatic film splicer comprising two alined film guiding members separated by a transverse gap and adapted to carry the ends of corresponding films projecting in superposed relationship over the gap to be spliced thereon, a lateral support carrying the two guiding members and extending outside the gap, a control lever carried by said support to pivot between an upper position and a lower position through an intermediate position round an axis parallel with the alined guiding members and spaced with reference thereto, a single knife extending in a plane perpendicular to the alined guiding members and adapted to be shifted into the gap to cut through both film ends, a carrier for said knife adapted to be shifted in a plane perpendicular to the pivotal axis of the control lever by the depression of said control lever between its upper and intermediate positions, out of an upper gap-releasing position through a position for which the knife cuts the film ends in the gap into a lowermost position for which the knife lies underneath the film ends, a spring blade carried by said knife carrier and adapted to extend transversely over the abutting cut film ends across the gap when the control lever is in said intermediate position and the carrier is in its lowermost position, a spool of an adhesive strip carried by the lateral support, revolvable round an axis parallel with the axis of the control lever and adapted to feed the strip in a direction perpendicular to the film-guiding members onto the knife carrier immediately underneath the spring blade between the latter and the film ends, means controlled by the depression of the control lever into its intermediate position to hold the lower surfaces of the cut ends of the film against the underside of the blade spring with the interposition of the free end of the adhesive strip, a slideway perpendicular to the film guiding members adapted to guide the knife carrier out of its lowermost position in a transverse direction with reference to the guiding members, means whereby the depression of the control lever between its intermediate and lower positions shifts said knife carrier with the end of the adhesive strip along the slideway to constrain said end of the adhesive strip to fold and slip along the underside of the abutting film ends on their guiding members, a resilient pad rigid with the underside of the control lever and urging a section of the adhesive strip adjacent the film ends against the knife carrier upon entrance of said control lever into its lower position, and means carried by the underside of said control lever and adapted to cut through the adhesive strip alongside the edges of the abutting film ends upon entrance of the control lever into said lower position.

2. An automatic film splicer comprising two alined guiding members separated by a transverse gap and adapted to carry the ends of corresponding films projecting in superposed relationship with their terminal perforations in registry over the gap to be spliced thereon, a lateral support carrying the two guiding members and extending outside the gap, a control lever carried by said support to pivot between an upper position and a lower position through an intermediate position round an axis parallel with the alined guiding members and spaced with reference thereto, a single knife extending in a plane perpendicular to the alined guiding members and adapted to be shifted into the gap to cut through both film ends, a carrier for said knife adapted to be shifted in a plane perpendicular to the pivotal axis of the control lever by the depression of said control lever between its upper and intermediate positions out of an upper gap-releasing position through a position for which the knife cuts the film ends in the gap into a lowermost position for which the knife lies underneath the film ends, a spring blade carried by said knife carrier and adapted to extend transversely over the abutting cut film ends across the gap when the control lever is in said intermediate position and the carrier is in its lowermost position, a spool of an adhesive strip carried by the lateral support, revolvable round an axis parallel with the axis of the control lever and adapted to feed the strip in a direction perpendicular to the film-guiding members onto the knife carrier immediately underneath the spring blade between the latter and the film ends, means controlled by the depression of the control lever into its intermediate position to hold the lower surfaces of the cut ends of the film against the underside of the blade spring with the interposition of the free end of the adhesive strip, a slideway perpendicular to the film guiding members adapted to guide the knife carrier out of its lowermost position in a transverse direction with reference to the guiding members, means whereby the depression of the control lever between its intermediate and lower positions shifts the said knife carrier with the end of the adhesive strip along the slideway to constrain said end of the adhesive strip to fold and slip along the underside of the abutting film ends on their guiding members, a resilient pad rigid with the underside of the control lever and urging a section of the adhesive strip adjacent the film ends against the knife carrier upon entrance of said control lever into its lower position, means carried by the underside of said control lever and adapted to cut through the adhesive strip alongside the edges of the abutting film ends upon entrance of the control lever into said lower position, and a perforator rigid with the underside of the control lever and adapted when the latter has entered its lower position to produce a perforation in the adhesive strip in registry with the terminal perforations in the film ends.

3. An automatic film splicer comprising two alined guiding members separated by a transverse gap and adapted to carry the ends of corresponding films projecting in superposed relationship over the gap to be spliced thereon, a lateral support carrying the two guiding members and extending outside the gap, and provided with a horizontal slot extending perpendicularly to the gap at a level underneath the latter, a slideway rigid with the support and provided with a slot extending in a vertical plane and including a bent section and a horizontal section merging into said bent section, a control lever carried by said support to pivot between an upper position and a lower position through an intermediate position round an axis parallel with the alined guiding members and spaced with reference thereto, a single knife perpendicular to the alined guiding members and adapted to be shifted into the gap to cut through both film ends, a carrier for said knife, pivotally secured to the control lever round an axis parallel with the pivotal axis of the control lever, two pivots rigid with the knife carrier and engaging respectively the U-shaped slot and the horizontal slot to constrain the controlled lever when depressed between its upper and intermediate positions to shift the knife carrier out of an upper gap-releasing position through a position for which the knife cuts the film ends in the gap into a lowermost position for which the knife lies underneath the film ends, a spring blade carried by said knife carrier and adapted to extend transversely over the abutting cut film ends across the gap when the control lever is in said intermediate position and the carrier is in its lowermost position, a spool of an adhesive strip carried by the lateral support, revolvable round an axis parallel with the axis of the control lever and adapted to feed the strip in a direction perpendicular to the film guiding members onto the knife carrier immediately underneath the spring blade between the latter and the film ends, means controlled by the depression of the control lever into its intermediate position to hold the lower surfaces of the cut ends of the film against the underside of the blade spring with the interposition of the free end of the adhesive strip, a means whereby the control lever when depressed between its intermediate and lower positions shifts said knife carrier horizontally with the end of the adhesive strip under the guidance of the projections in the horizontal slot and horizontal slot sections respectively to constrain said end of the adhesive strip to fold and slip along the underside of the abutting film ends on their guiding members, a resilient pad rigid with the underside of the control lever and urging a section of the adhesive strip adjacent the film ends against the knife carrier upon entrance of said control lever into its lower position, and means carried by the underside of said control lever and adapted to cut through the adhesive strip alongside the edges of the abutting film ends upon entrance of the control lever into said lower position.

4. An automatic film splicer comprising two alined film guiding members separated by a transverse gap and adapted to carry the ends of corresponding films projecting in superposed relationship over the gap to be spliced thereon, a lateral support carrying the two guiding members and extending outside the gap, a control lever carried by said support to pivot between an upper position into a lower position through an intermediate position round an axis parallel with the alined guiding members and spaced with reference thereto, a single knife extending in a plane perpendicular to the alined guiding members and adapted to be shifted into the gap to cut through both film ends, a carrier for said knife, adapted to be shifted in a plane perpendicular to the pivotal axis of the control lever by the depression of said control lever between its upper and intermediate positions, out of an upper gas-releasing position through a position for which the knife cuts the film ends in the gap into a lowermost position for which the knife lies underneath the film ends, a spring blade carried by said knife carrier and adapted to extend transversely over the abutting cut film ends across the gap when the control lever is in said intermediate position and the carrier is in its lowermost position, a spool of an adhesive strip carried by the lateral support, revolvable round an axis parallel with the axis of the control lever and adapted to feed the strip in a direction perpendicular to the film guiding members onto the knife carrier immediately underneath the spring blade between the latter and the film ends, an auxiliary support adapted to engage the undersides of the film ends to form a bearing for the latter, a rocking member controlled by the sinking of the knife carrier into its lowermost position and adapted to urge said auxiliary support into its operative position, a slideway perpendicular to the film guiding members adapted to guide the knife carrier out of its lowermost position in a transverse direction with reference to the guiding members, means whereby the depression of the control lever between its intermediate and lower positions shifts said knife carrier with the end of the adhesive strip along the slideway to constrain said end of the adhesive strip to fold and slip along the underside of the abutting film ends on their guiding members, a resilient pad rigid with the underside of the control lever and urging a section of the adhesive strip adjacent the film ends against the knife carrier upon entrance of said control lever into its lower position, and means carried by the underside of said control lever and adapted to cut through the adhesive strip alongside the edges of the abutting film ends upon entrance of the control lever into said lower position.

References Cited by the Examiner
UNITED STATES PATENTS

| 2,346,142 | 4/44 | Anderson | 156—483 |
| 2,346,874 | 4/44 | Russell | 156—505 |
| 2,565,009 | 8/51 | Wallingsford | 156—505 |
| 3,050,107 | 8/62 | Barry et al. | 156—506 |

EARL M. BERGERT, *Primary Examiner.*

DOUGLAS J. DRUMMOND, *Examiner.*